United States Patent
Hoagland et al.

(10) Patent No.: US 8,478,634 B2
(45) Date of Patent: Jul. 2, 2013

(54) REHABILITATION OF UNDERPERFORMING SERVICE CENTERS

(75) Inventors: Strand M. Hoagland, Scottsdale, AZ (US); Nathan Dent, Concord, NC (US); Thomas R. Pepera, II, Jacksonville, FL (US); Pamela M. Ferrell, Richmond, VA (US); Richard L. Fitzgerald, Davidson, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 13/280,561

(22) Filed: Oct. 25, 2011

(65) Prior Publication Data

US 2013/0103453 A1  Apr. 25, 2013

(51) Int. Cl.
*G06Q 10/00* (2012.01)
*G06F 15/173* (2006.01)

(52) U.S. Cl.
USPC ............... 705/7.38; 705/7.25; 709/224

(58) Field of Classification Search
USPC ................. 705/7.25, 7.38; 709/224
See application file for complete search history.

(56) References Cited

U.S. PATENT DOCUMENTS

| | | | |
|---|---|---|---|
| 5,819,028 A * | 10/1998 | Manghirmalani et al. | 714/57 |
| 7,099,942 B1 * | 8/2006 | Wilson et al. | 709/224 |
| 7,216,169 B2 * | 5/2007 | Clinton et al. | 709/224 |
| 7,734,966 B1 * | 6/2010 | Lee et al. | 714/718 |
| 2003/0135609 A1 * | 7/2003 | Carlson et al. | 709/224 |
| 2006/0168191 A1 * | 7/2006 | Ives | 709/224 |
| 2008/0312988 A1 * | 12/2008 | Trapp et al. | 705/7 |
| 2009/0112809 A1 * | 4/2009 | Wolff et al. | 707/3 |
| 2009/0158189 A1 * | 6/2009 | Itani | 715/772 |
| 2009/0292941 A1 * | 11/2009 | Ganai et al. | 714/2 |
| 2010/0274596 A1 | 10/2010 | Grace et al. | |
| 2010/0275054 A1 * | 10/2010 | Grace et al. | 714/2 |

* cited by examiner

*Primary Examiner* — Jonathan G Sterrett
*Assistant Examiner* — Folashade Anderson
(74) *Attorney, Agent, or Firm* — Weiss & Arons LLP; Michael Springs

(57) ABSTRACT

This disclosure provides apparatus and methods for rehabilitating an underperforming service center operated by an entity. The service center may be included in a plurality of service centers. A service center may be characterized as underperforming based on a calculated health score. The health score may be based on a technology malfunction that occurred at the service center. The health score may be based on an intensity score. The health score may be based on an incident count. The health score may be based on a network count. The health score may be compared to a threshold. If the health score is below the threshold, the service center may be characterized as underperforming. A service center characterized as underperforming may be included in a chronic list. The chronic list may be mined for patterns characteristic of an underperforming service center.

16 Claims, 6 Drawing Sheets

| CLASS (201) | SUB-CLASS (203) | ALERT TITLE (205) |
|---|---|---|
| SERVICE CENTER - GENERAL | | |
| DESKTOP | DESKTOP/HARDWARE | PROCESS(ES) NOT RUNNING |
| | DESKTOP/APPLICATION | C: USAGE OVER 90% |
| NETWORK | DATA | COMM SERVER PROCESS(ES) NOT RUNNING |
| | VOICE | CPU USAGE IS TOO HIGH |
| SERVER | SERVER/HARDWARE | CPU USAGE ON TERMINAL 001 OVER 90 FOR 10m |
| | DESKTOP/OS SYSTEM SOFTWARE | DOWN OVER 3 HOURS FOR CHANGE CONTROL |
| | PLATFORM | DRIVE C REBUILDING |
| | NETWORK/CONNECTIVITY | DRIVE C RECOVERING |
| | DESKTOP/OS SYS SOFTWARE | DRIVE E HAS BAD BLOCK(S) |
| | SERVER/APPLICATION | DRIVE C IS MORE THAN 90% FULL |
| | SERVER/OS SYS SOFTWARE | Host0001 0002E NODE NOT STARTED |
| | NETWORK/HARDWARE | Host0001 INACTIVE |
| | NETWORK COMPUTING GROUP | Host0001 PENDING ACTIVE |
| | SERVER/OS SYS SOFTWARE | NO HEARTBEAT (ONLY ALERTS EXCEEDING 10min IN DURATION AND ONES DURING BUSINESS HOURS) |
| | HARDWARE | SHUTDOWN CAUSED BY LOSS OF POWER |
| | | LOST HEARTBEAT ON TERMINAL 002 (DURATION GREATER THAN 48 HOURS) |
| | | PACKAGES OUT OF SYNC ON TERMINAL 003 |

FIG. 2

| 301 INTENSITY SCORE | 303 HEALTH SCORE | 305 INCIDENT COUNT | 307 HEALTH SCORE | 309 VOICE AND DATA NETWORK COUNT | 311 HEALTH SCORE |
|---|---|---|---|---|---|
| 0 | 100.00% | 0 | 100.00% | 0 | 100% |
| 1 | 99.14% | 1 | 98.00% | 1.00 | 94.0% |
| 2 | 98.28% | 2 | 96.00% | 2.00 | 88.0% |
| 3 | 97.42% | 3 | 94.00% | 3.00 | 82.0% |
| 4 | 96.56% | 4 | 92.00% | 4.00 | 76.0% |
| 5 | 95.70% | 5 | 90.00% | 5.00 | 70.0% |
| 6 | 94.84% | 6 | 88.00% | 6.00 | 64.0% |
| 7 | 93.98% | 7 | 86.00% | 7.00 | 58.0% |
| 8 | 93.12% | 8 | 84.00% | 8.00 | 52.0% |
| 9 | 92.26% | 9 | 82.00% | 9.00 | 46.0% |
| 10 | 91.40% | 10 | 80.00% | 10.00 | 40.0% |
| 11 | 90.54% | 11 | 78.00% | 11.00 | 34.0% |
| 12 | 89.68% | 12 | 76.00% | 12.00 | 28.0% |
| 13 | 88.82% | 13 | 74.00% | 13.00 | 22.0% |
| 14 | 87.96% | 14 | 72.00% | | |
| 15 | 87.10% | 15 | 70.00% | | |
| 16 | 86.24% | 16 | 68.00% | | |
| 17 | 85.38% | 17 | 66.00% | | |
| 18 | 84.52% | 18 | 64.00% | | |
| 19 | 83.66% | 19 | 62.00% | | |
| 20 | 82.80% | 20 | 60.00% | | |
| 21 | 81.94% | 21 | 58.00% | | |
| 22 | 81.08% | 22 | 56.00% | | |
| 23 | 80.22% | 23 | 54.00% | | |
| 24 | 79.36% | 24 | 52.00% | | |
| 25 | 78.50% | 25 | 50.00% | | |
| 26 | 77.64% | 26 | 48.00% | | |
| 27 | 76.78% | 27 | 46.00% | | |
| 28 | 75.92% | 28 | 44.00% | | |
| 29 | 75.06% | 29 | 42.00% | | |
| 30 | 74.20% | 30 | 40.00% | | |
| 31 | 73.34% | 31 | 38.00% | | |
| 32 | 72.48% | 32 | 36.00% | | |
| 33 | 71.62% | 33 | 34.00% | | |
| 34 | 70.76% | 34 | 32.00% | | |
| 35 | 69.90% | 35 | 30.00% | | |

FIG. 3

| INITIAL DATE CHRONIC CRITERIA MET | DATE NEXT EXIT HEALTH SCORE IS CALCULATED | DAYS UNTIL ELIGIBLE TO LEAVE | DAYS CHRONIC | REPEAT CHRONIC? | LAST CHRONIC DATE | POSITION ON LIST | PRIORITY OF WORK | MAIL CODE | LOCATION | STATE | NATIONAL REGION |
|---|---|---|---|---|---|---|---|---|---|---|---|
| JUNE 19 | JULY 17 | 27 | 2 | | | NEW ENTRANT - HS 60-75% | DISTRESSED | xxx-xxxx-xx-xx | ANYTOWN 1 | NY | NORTHEAST |
| JUNE 12 | JULY 10 | 20 | 9 | | | NEW ENTRANT - HS 60-75% | DISTRESSED | xxx-xxx-xx-xx | ANYTOWN 2 | IL | MIDWEST |
| MAY 15 | JUNE 26 | 6 | 37 | | | DID NOT MEET EXIT CRITERIA (AFTER 30 DAYS) | INTENSIVE | xxx-xxxx-xx-xx | ANYTOWN 3 | CA | SOUTH |
| JUNE 19 | JULY 17 | 27 | 2 | | | NEW ENTRANT - HS 60-75% | DISTRESSED | xxx-xxx-xx-xx | ANYTOWN 4 | CT | NORTHEAST |
| JUNE 19 | JULY 17 | 27 | 2 | Y | 11/7/2010 | REPEAT ENTRANT - PREVIOUS HS 60-75% | CRITICAL | xxx-xxx-xx-xx | ANYTOWN 5 | MO | MIDWEST |
| MAY 29 | JUNE 26 | 6 | 23 | | | NEW ENTRANT - HS 60-75% | DISTRESSED | xxx-xxxx-xx-xx | ANYTOWN 6 | DE | NORTHEAST |
| JUNE 5 | JULY 3 | 13 | 16 | | | NEW ENTRANT - HS 60-75% | DISTRESSED | xxx-xxx-xx-xx | ANYTOWN 7 | OR | WEST |
| JUNE 12 | JULY 10 | 20 | 9 | | | NEW ENTRANT - HS 60-75% | DISTRESSED | xxx-xxx-xx-xx | ANYTOWN 8 | MA | NORTHEAST |
| MAY 29 | JUNE 26 | 6 | 23 | Y | 9/5/2010 | REPEAT ENTRANT - PREVIOUS HS 60-75% | CRITICAL | xxx-xxx-xx-xx | ANYTOWN 9 | AR | MIDWEST |
| JUNE 12 | JULY 10 | 20 | 9 | | | NEW ENTRANT - HS 60-75% | DISTRESSED | xxx-xxx-xx-xx | ANYTOWN 10 | RI | NORTHEAST |
| JUNE 19 | JULY 17 | 27 | 2 | | | NEW ENTRANT - HS 60-75% | DISTRESSED | xxx-xxx-xx-xx | ANYTOWN 11 | FL | SOUTH |
| JUNE 19 | JULY 17 | 27 | 2 | | | NEW ENTRANT - HS 60-75% | DISTRESSED | xxx-xxx-xx-xx | ANYTOWN 12 | NY | NORTHEAST |
| APRIL 24 | JUNE 26 | 6 | 58 | Y | 1/9/2011 | DID NOT MEET EXIT CRITERIA (AFTER 30 DAYS) | CRITICAL | xxx-xxx-xx-xx | ANYTOWN 13 | MA | NORTHEAST |
| MAY 29 | JUNE 26 | 6 | 23 | | | NEW ENTRANT - HS 60-75% | DISTRESSED | xxx-xxx-xx-xx | ANYTOWN 14 | CA | SOUTH |

FIG. 4

| DATE | PERCENT OF ACTIVE CHRONIC SERVICE CENTERS | AVERAGE SERVICE CENTER HEALTH SCORE | # OF ACTIVE CHRONIC SERVICE CENTERS | # OF SERVICE CENTERS OF CHRONIC LIST 30 DAYS OR MORE | AVERAGE TIME ON CHRONIC LIST 30 DAYS OR MORE | # OF NEW CHRONIC SERVICE CENTERS | # OF SCs RECOVERED | # OF REPEAT CHRONIC SCs | ROLLING 30 DAY AVERAGE OF INCIDENTS & ALERTS PER SC |
|---|---|---|---|---|---|---|---|---|---|
| 7/11/2010 | 1.5% | 93.53% | 90 | 26 | 39 | 15 | 0 | 0 | 2.01 |
| 7/18/2010 | 1.8% | 93.26% | 107 | 28 | 44 | 26 | 0 | 1 | 2.12 |
| 7/25/2010 | 1.5% | 93.17% | 91 | 29 | 47 | 17 | 0 | 1 | 2.18 |
| 8/1/2010 | 2.0% | 92.41% | 118 | 31 | 51 | 31 | 9 | 0 | 2.55 |
| 8/8/2010 | 1.9% | 93.25% | 112 | 30 | 56 | 4 | 10 | 0 | 2.19 |
| 8/15/2010 | 1.8% | 93.41% | 105 | 31 | 58 | 9 | 9 | 0 | 2.10 |
| 8/22/2010 | 1.6% | 93.61% | 97 | 37 | 58 | 7 | 36 | 1 | 2.00 |
| 8/29/2010 | 1.4% | 93.73% | 81 | 34 | 63 | 10 | 4 | 0 | 1.90 |
| 9/5/2010 | 1.3% | 93.81% | 75 | 38 | 58 | 8 | 7 | 1 | 1.90 |
| 9/12/2010 | 1.1% | 93.81% | 64 | 26 | 71 | 7 | 15 | 2 | 1.90 |
| 9/19/2010 | 1.1% | 93.87% | 64 | 24 | 70 | 11 | 16 | 1 | 1.80 |
| 9/26/2010 | 1.0% | 93.91% | 57 | 25 | 61 | 6 | 20 | 0 | 1.80 |
| 10/3/2010 | 1.0% | 93.79% | 57 | 20 | 71 | 7 | 14 | 0 | 1.80 |
| 10/10/2010 | 0.9% | 93.74% | 56 | 18 | 78 | 9 | 13 | 3 | 1.80 |
| 10/17/2010 | 0.9% | 93.86% | 55 | 15 | 85 | 11 | 12 | 1 | 1.70 |
| 10/24/2010 | 1.0% | 93.94% | 59 | 19 | 78 | 8 | 11 | 1 | 1.80 |
| 10/31/2010 | 0.9% | 94.34% | 56 | 20 | 80 | 8 | 11 | 1 | 1.60 |
| 11/7/2010 | 1.0% | 94.28% | 60 | 16 | 92 | 11 | 15 | 3 | 1.70 |

FIG. 5

REHABILITATION OF UNDERPERFORMING SERVICE CENTERS

FIELD OF TECHNOLOGY

Aspects of this disclosure relate to characterizing and rehabilitating a service center that experiences technology malfunctions that impact a customer experience in using the service center.

BACKGROUND

A large entity with many customers in diverse locations may operate a service center to provide goods and services to customers. The entity may operate one or more service centers located in diverse geographic locations. Each service centers may be staffed by employees of the entity and may utilize various technologies to operate.

The employees and customers of the entity may be negatively impacted when a technology used at the service center performs poorly or experiences downtime. A technology malfunction may result in long lines of customers waiting for service, slow transaction speeds, or even a closing of a service center. Correcting the technology malfunction may require employee time that would have otherwise been devoted to serving customers.

If customers are consistently unable to access the goods or services they desire in a timely, orderly fashion, the customers may seek an alternative entity to provide their desired goods or services. Therefore, the technology malfunction may present a monetary risk to the entity.

A technology malfunction may impact an ability of an employee of the entity to service a customer. The employee may be dissatisfied with an inability to service a customer. Therefore, the technology malfunction may impact morale of the employee of the entity.

Technology malfunctions at a specific service centers may be viewed by stakeholders in the entity as indicative of systemic technology challenges. Thus, an underperforming service center may pose a risk of damage to goodwill of the entity.

It would be desirable, therefore, to provide apparatus and methods that characterize service centers that experience technology malfunctions.

It also would be desirable to, allocate, based on the characterization of the service center, resources to alleviate and prevent the technology malfunctions.

It further would be desirable to provide accurate and timely reporting of the characterization of the service center and associated metrics derived from the characterization.

SUMMARY OF THE DISCLOSURE

This disclosure provides apparatus and methods for rehabilitating an underperforming service center operated by an entity. The service center may be included in a plurality of service centers.

A service center may be characterized as underperforming based on a calculated health score. The health score may be based on a technology malfunction that occurred at the service center.

The health score may be based on an intensity score. The health score may be based on an incident count. The health score may be based on a network count.

The health score may be compared to a threshold. If the health score is below the threshold, the service center may be characterized as underperforming.

A service center characterized as underperforming may be included in a chronic list. The chronic list may be mined for patterns characteristic of an underperforming service center.

A service center characterized as underperforming may be allocated resources. The resources may be allocated based on a priority. The priority may be based on the health score.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows illustrative information that may be used in accordance with principles of the invention;

FIG. 3 shows illustrative information that may be used in accordance with principles of the invention;

FIG. 4 shows illustrative information that may be generated in accordance with principles of the invention;

FIG. 5 shows an illustrative display of information that may be generated in accordance with principles of the invention.

DETAILED DESCRIPTION OF THE DISCLOSURE

Figure 1:
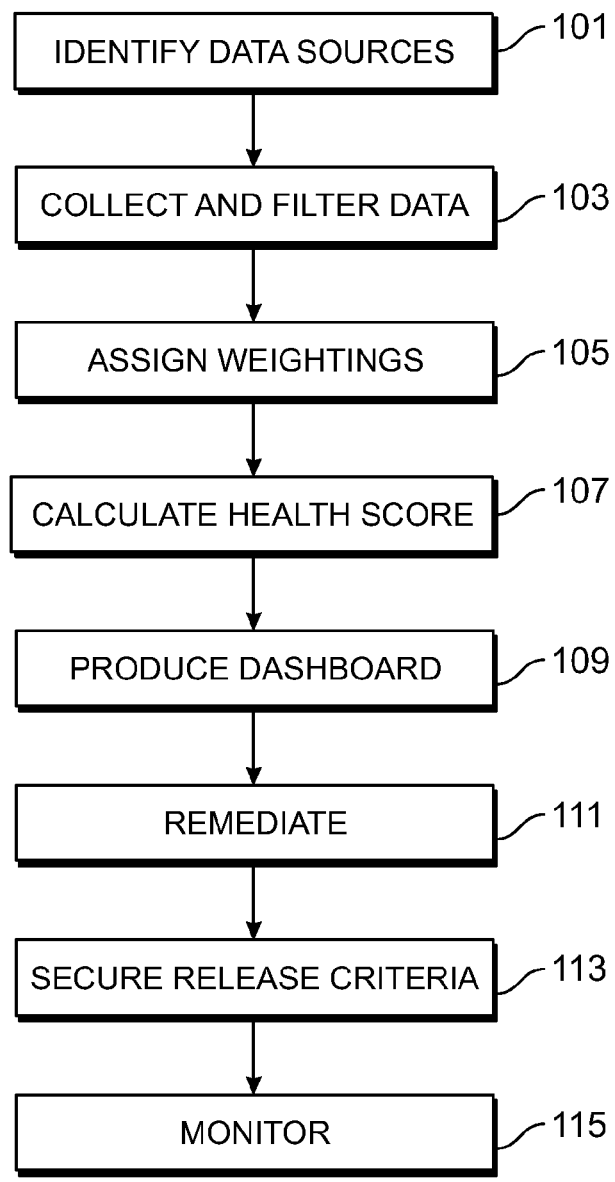
FIG. 1 shows an illustrative process in accordance with principles of the invention.

Apparatus and methods for characterizing a service center are provided. A service center may include a self-serve kiosk such as an automated teller machine. A service center may be an automated teller machine.

The apparatus and methods may identify a data source that may include an indicator of whether a service center is experiencing a technology malfunction. The data source may include a record of one or more technology malfunctions that occurred at one or more service centers operated by the entity.

The data source may be identified by evaluating whether the data source includes an indicator of whether a service center is underperforming. For example, the indicators may include a technology malfunction that occurred at a service center operated by the entity. The technology malfunction may be subject to a filter that selects technology malfunctions based on the evaluating.

The technology malfunction may be associated with a class. The technology malfunction may be associated with a sub-class. The evaluating may include an assessment that a technology malfunction included in the class or the sub-class is relevant in characterizing a service center as underperforming.

For example, the evaluating may include an assessment that a technology malfunction included in the class or the sub-class has a direct effect on a customer experience at a service center, effects operation of the service center or any suitable criteria.

The technology malfunction may be subject to a filter that selects technology malfunctions based on the class and the sub-class.

Each technology malfunction may be logically associated with a particular service center. The technology malfunction may be filtered to identify a technology malfunction that is associated with a particular service center.

The technology malfunction may be an incident ticket. The technology malfunction may be a vendor dispatch.

An incident ticket may be opened when a technology malfunction is observed at the service center. The entity may dispatch a vendor to repair the observed technology malfunction. A vendor dispatch is an instruction sent to vendor to repair/correct a technology malfunction.

The technology malfunction may include an automatically detected technology malfunction. The incident ticket or vendor dispatch may be an automatically detected technology malfunction.

Each technology malfunction may be "weighted" based on how severely it impacts an ability of the service center to operate.

The technology malfunction with a higher potential impact on operation of a center may be preferentially weighted. For example, it may be determined that a Network/Communications/Server malfunction has a potential impact that is greater than the potential impact of another technology malfunction. The Network/Communications/Server malfunction, may therefore be preferentially weighted. For example, the Network/Communications/Server malfunction may be assigned a "weight" of three, whereas the other technology malfunction may be assigned a "weight" of one. Any suitable weight may be used, such as a real number or an imaginary number.

Based on the information obtained from the data source, a health score may be calculated for the service center. The health score may characterize the service center as experiencing frequent technology malfunctions. A service center experiencing frequent technology malfunctions may be characterized as underperforming.

The apparatus may include one or more non-transitory computer-readable media storing computer-executable instructions. The computer-executable instructions may, when executed by a processor on a computer system, perform a method of characterizing a service center.

The methods for characterizing the service center may include associating a category with a service center technology malfunction, assigning a value to the category, counting the technology malfunction, and calculating a health score for the service center. The health score may be based on the value and the counting.

The methods may include determining if the health score is below a threshold. The threshold may be a chosen health score. The chosen health score may correspond to a division between service centers that are characterized as underperforming and service centers that are adequately performing. If the health score is below the threshold, the service center may be characterized as underperforming.

The threshold may be adjustable. For example, the threshold may be initially set to capture approximately a top 0.05% of service centers operated by the entity. The threshold may be adjusted to capture more or fewer service centers. For example, the threshold may later be reduced to capture a larger number of service centers as overall health scores of individual service centers improve.

Based on the health score, resources may be allocated to rehabilitate the service center. If the health score is below the threshold, the methods may include allocating resources to rehabilitate the service center. Resources may include people, tools and processes for improving the health score. For example, the allocating resources may include designating personnel, funds and/or equipment or any other suitable resources to cure the technology malfunction that occurred at the service center.

The category may be included in a plurality of categories. The value may be included in a plurality of values. The technology malfunction may be included in a plurality of technology malfunctions.

Each of the technology malfunctions may be associated with a category. Each category may be associated with a value.

For example, a service center, such as service center $SC_j$, may be included in a plurality of service centers defined by $SC_{j|\forall j=1, 2, 3 \ldots J}$.

A category, such as $Category_k$, may be included in a plurality of categories defined by $Category_{k|\forall k=1, 2, 3 \ldots K}$.

A value such as $Value_k$ may be included in a plurality of values defined by $Value_{k|\forall k=1, 2, 3 \ldots K}$. Each $Category_k$ may be associated with a corresponding $Value_k$.

A technology malfunction, such as technology malfunction $TM_{l,j,k}$ may be included in a plurality of technology malfunctions defined by $TM_{l,j,k|\forall l=1, 2, 3 \ldots L(j,k)}$. $L(j,k)$ may correspond to a number of technology malfunctions. $L(j,k)$ may correspond to zero.

The technology malfunction $TM_{l,j,k}$ may be associated with the service center $SC_j$. The technology malfunction $TM_{l,j,k}$ may be associated with the category $Category_k$.

The counting may include formulating a total number of the technology malfunctions. The counting may include formulating for each of the categories a product of: (a) a total number of the technology malfunctions that correspond to the category; and (b) the value that is associated with the category.

For example, the counting may include formulating a total number of technology malfunctions using equation 1. Equation 1 gives, for a service center $SC_j$, a total number of the technology malfunctions, $TNTM_j$, that are associated with the plurality of categories $Category_{k|\forall k=1, 2, 3 \ldots K}$.

$$TNTM_j = \sum_{k=1}^{K} L(j, k) \qquad \text{Eqn. 1}$$

In equation 1:

$L(j,k)$ is a number of the technology malfunctions associated with service center $SC_j$ and the $Category_k$; and $k=1, 2, 3 \ldots K$ is an index number corresponding to one of the categories included in the plurality of categories $Category_{k|\forall k=1, 2, 3 \ldots K}$.

A total number of technology malfunctions $TM_{l,j,k|\forall l=1, 2, 3 \ldots L(j,k)}$ may be calculated for all service centers $SC_{j|\forall j=1, 2, 3 \ldots J}$ operated by the entity. An average number of technology malfunctions per service center $SC_j$ may be calculated.

As a further example, the counting may include equation 2. Equation 2 gives, each of the categories $Category_{k|\forall k=1, 2, 3 \ldots K}$, a weighted count $WC_{j,k}$ for the service center $SC_j$. Equation 2 includes formulating the product of: (a) $L(j,k)$, the number of the technology malfunctions $TM_{l,j,k}$ that are associated with service center $SC_j$ and the $Category_k$; and (b) $Value_k$, the value that is associated with the $Category_k$.

$$WC_{j,k} = Value_k * L(j,k) \qquad \text{Eqn. 2}$$

The methods may include calculating the health score on a weekly basis. The health score may be based on one or more technology malfunctions that occurred in a period preceding the calculating. The period may have any suitable length, such as one hour, one day, seven days, two weeks, thirty days, one-month, three months, six months, one year, two years, five years or any other suitable length. The length of the period may be based on an occurrence of a technology malfunction or any suitable occurrence.

The calculating may be based on a previously calculated health score. For example, if a previously calculated health score of the service center may have been below the threshold. If a currently calculated health score of the service center is above the threshold, the pervious health score may be accounted for in characterizing the service center as underperforming.

The methods may include associating information from the data source with a service center based on an organizational mailcode. For example, a technology malfunction may be associated with the service center based on an organizational mailcode. The organizational mailcode may include a unique identifier that associates the technology malfunction with the service center.

The organizational mailcode may associate the technology malfunction with the service center irrespective of another classification that may be associated with the technology malfunction or the data source. For example, the entity may generally classify technology malfunctions based on a technology or mechanism for repairing the malfunction.

Associating information with the service center based on the organizational mailcode may require that a mailcode that is associated with non-production sites (such as a training site or laboratory), back office sites, or other selected business units is filtered out.

The service center may be one of a plurality of service centers. The methods may include prioritizing the allocating of resources among the plurality of service centers based on the health score of each service center. For example, the prioritizing may include assigning a designation, based on the health score, to the service center. The designation may include "distressed," "critical," "intensive," "in-recovery" or any other suitable designation.

For example, the "distressed" designation may correspond to a service center with a health score twenty percentage points below the threshold. The "critical" designation may correspond to a service center with a health score twenty to thirty percentage points below the threshold. The "intensive" designation may correspond to a service center with a difference between the health score and the threshold of forty percentage points or more.

Resources may be allocated to a service center designated as "intensive" before resources are allocated to service centers designated as "critical" or "distressed." Resources may be allocated to a service center designated as "critical" before resources are allocated to a service center designated "distressed." Resources may be allocated to a service center designated as "distressed" after resources have been allocated to service centers designated as "intensive" or "critical."

The prioritizing may be based on a difference between the calculated health score and the threshold. The prioritizing may be based on an amount of time the health score of the service center is below the threshold.

If the health score is below the threshold, the service center may be placed on a chronic list. The method may further include identifying resources that may be deployed to rehabilitate the service center included in the chronic list. A Service center with a health score that is below the threshold may be added to the chronic list for a time period. The time period may have any suitable length, such as one hour, one day, seven days, two weeks, thirty days, one-month, three months, six months, one year, two years, five years or any other suitable length. The length of the period may be based on an occurrence of a technology malfunction or any suitable occurrence.

The prioritizing may include identifying a service center that has remained on the chronic list for a period of time. For example, if a service center has remained on the chronic list for sixty or more days, the service center may be designated as "critical" and allocated resources accordingly. If a service center has remained on the chronic list for ninety or more days, the service center may be designated as "intensive" and allocated resources accordingly.

As a further example, a service center that is added to the chronic list more than once may be designated as "critical" irrespective of a difference between a currently calculated health score and the threshold.

The methods may include recalculating the health score of an underperforming service center. If a recalculated health score is above the threshold, the service center may be placed on a recovery list.

The methods may include mining the chronic list for common characteristics of underperforming service centers.

The methods may include mining the recovery list for common characteristics of underperforming service centers that have been rehabilitated.

Mining the chronic list and/or the recovery list may provide leverage to the entity in renegotiating existing contracts and/or forming new contracts. Information obtained from the mining may demonstrate, for example, to business associates of the entity, a current state of service centers characterized as underperforming and progress made in reducing a number of service centers characterized as underperforming.

The apparatus and methods may include calculating a health score and, based on the health score, characterizing the service center as underperforming. The health score may be a minimum of a normalized intensity score, a normalized incident score and a normalized network count.

For example, an intensity score of 35, an incident count of 15 and a network count of 5 may each be normalized to correspond to a health score of 70%. The threshold may be set to correspond to a health score of 70% or below.

The intensity score may be based on a first number of service center technology malfunctions. The incident score may be based on a second number of service center technology malfunctions. The network count may be based on a third number of service center technology malfunctions.

Each number of service center technology malfunctions may include counting a service center technology malfunction that is associated with an auto detection of the first malfunction. Each number of service center technology malfunctions may include counting a service center technology malfunction that is associated with a request to repair the second malfunction.

The first number of service center technology malfunctions may be associated with a first category. The first category may be included in a plurality of categories. The second number of service center technology malfunctions may be associated with the plurality of categories. The third number of service center technology malfunctions may be associated with a second category. The second category may be included in the plurality of categories.

Each of the categories may be associated with a value. The value may represent a severity of the malfunction associated with the category.

For example, as stated above, a service center, such as service center $SC_j$ may be included in a plurality of service centers defined by $SC_{j|\forall j=1,2,3...J}$.

A category, such as $Category_k$, may be included in a plurality of categories defined by $Category_{k|\forall k=1,2,3...K}$.

A value such as $\text{Value}_k$ may be included in a plurality of values defined by $\text{Value}_{k|\forall k=1, 2, 3 \ldots K}$. Each $\text{Category}_k$ may be associated with a corresponding $\text{Value}_k$.

A service center technology malfunction, such as technology malfunction $TM_{l,j,k}$, may be included in a plurality of technology malfunctions defined by $TM_{l,j,k}|\forall l=1,2,3\ldots L(j,k)}$.

The technology malfunction $TM_{l,j,k}$ may be associated with the service center $SC_j$. The technology malfunction $TM_{l,j,k}$ may be associated with the $\text{Category}_k$. $L(j,k)$ may correspond to a number of technology malfunctions. $L(j,k)$ may correspond to a number of technology malfunctions associated with the category $\text{Category}_k$ and the service center $SC_j$. $L(j,k)$ may correspond to the number zero.

For example, $L(j,k)$ may correspond to a first number of technology malfunctions associated with a $\text{Category}_k$. The intensity score may be based on $L(j,k)$.

As a further example, Equation 3 may be used to calculate intensity score $IS_{j,k}$ of technology malfunctions associated with $\text{Category}_k$ and the service center $SC_j$.

$$IS_{j,k} = WC_{j,k} \quad \text{Eqn. 3}$$

In equation 3:

$WC_{j,k}$ is defined by equation 2.

The intensity score may be a maximum intensity score. The maximum intensity score may be an intensity score selected from among multiple intensity scores of technology malfunctions associated with a service center.

For example, equation 4 may be used to calculate a maximum intensity score $MIS_j$ of the technology malfunctions associated with the service center $SC_j$.

$$MIS_j = \max\{IS_{j,k}|\forall k=1,2,3\ldots K\} \quad \text{Eqn. 4}$$

In equation 4:

$IS_{j,k}$ is defined by equation 3;

max is a maximum number contained in a plurality of intensity scores; and $k=1, 2, 3 \ldots K$ is an index number corresponding to one of the categories included in the plurality of categories $\text{Category}_{k|\forall k=1, 2, 3 \ldots K}$.

The first number of service center technology malfunctions may be included in a plurality of numbers of service center technology malfunctions. The plurality of numbers may be associated with a plurality of categories. The plurality of categories may be associated with a plurality of values. The intensity score may be based on the plurality of numbers and the plurality of values.

For example, the plurality of numbers may correspond to $L(j,k)|_{k\forall k=1, 2, 3 \ldots K}$. The plurality of categories may correspond to $\text{Category}_{k|\forall k=1, 2, 3 \ldots K}$. The plurality of values may correspond to $\text{Value}_{k|\forall k=1, 2, 3 \ldots K}$. For a service center $SC_j$, an intensity score based on the pluralities, $ISP_j$, may be calculated using equation 5.

$$ISP_j = \sum_{k=1}^{K} IS_{j,k} \quad \text{Eqn. 5}$$

In equation 5:

$IS_{j,k}$ is defined by equation 3; and $k=1, 2, 3 \ldots K$ is an index number corresponding to one of the categories included in the plurality of categories $\text{Category}_{k|\forall k=1, 2, 3 \ldots K}$.

As a further example, for the service center $SC_j$, the total number of technology malfunctions, $TNTM_j$, as defined by Equation 1 may correspond to a second number of technology malfunctions. The incident count score may be based on Equation 1. The incident count score may be equal to $TNTM_j$.

The third number of service center technology malfunctions may be associated with a second category. For example, $L(j,k)$ may correspond to a third number of technology malfunctions. The second category may be $\text{Category}_k$.

For a service center $SC_j$ the technology malfunction $TM_{l,j,k}$ associated with the $\text{Category}_k$ may be a service center malfunction that corresponds to a malfunction of a network or communication link or device. The malfunction of a network and communication link or device may present a severe impediment to operation of the service center $SC_j$.

The network count may be equal to the third number of service center technology malfunctions. The network count may be based on $L(j,k)$. The network count may be equal to $L(j,k)$. $L(j,k)$ may be equal to a the number of malfunctions of network and communication links and devices that occurred at a service center $SC_j$.

The calculating may include calculating the health score weekly. The calculating may be based on a service center technology malfunction that occurred in a time period preceding the calculating. The time period may be any suitable time period. The calculating may be based on a previously calculated health score.

The methods may include filtering a service center technology malfunction based on an organizational mailcode.

The methods may include placing a service center characterized as underperforming on a chronic list. The methods may include identifying resources to rehabilitate service centers on the chronic list. The methods may include a process for rehabilitating the service center.

For example, for a service center to be removed from the chronic list, the following steps may be taken: (1) an incident ticket opened within the last thirty days and relating to a technology malfunction is investigated; (2) responsibility for remediation of the technology malfunction is assigned to an appropriate party; (3) the technology malfunction is repaired/resolved; (3) the health score is recalculated; and (4) a resolution of the technology malfunction is confirmed by the entity. The resolution of the technology malfunction may be confirmed by observing that the technology malfunction does not reoccur with a time period. The time period may be any suitable time period.

The methods may include recalculating the health score and determining if the health score is above the threshold. If the health score is above the threshold the methods may include placing the service center on a recovery list for a time period. The time period may be any suitable time period.

For example, a service center may be taken off the chronic list and placed on the recovery list if the recalculated health score is 90% or greater. A service center on the recovery list may be monitored to ensure the technology utilized by the service center remains operational for thirty days.

The methods may include mining the chronic list and/or recovery list for characteristics of underperforming service centers. The characteristics obtained from the mining may suggest preventive measures that may be taken by the entity to lower a number of service centers on the chronic list.

The methods may include mining the chronic list for patterns characteristic of an underperforming service center. The patterns may be leveraged in future dealings with business partners or stakeholders of the entity. An optimization technique may be applied to the patterns to reduce a number of underperforming service centers. Any suitable optimization technique may be used.

Apparatus and methods may include a dashboard. The dashboard may display and arrange information relating to service centers on the chronic list and/or the recovery list. The information may be obtained from the mining. The information may include metrics relating to the entity. The information may include metrics relating to a service center.

The dashboard may display a current status of the technology malfunctions of the service center. The current status may include details of the malfunction, a party assigned to repair the malfunction, steps taken to repair the malfunction, changes to the chronic list and any appropriate information. The current status may be updated as a changes occurs.

Following a rehabilitation, the service center may be monitored. The dashboard may display metrics associated with monitoring of the health score of the rehabilitated service center.

The dashboard may provide reporting to a business partner of the entity. For example, the dashboard may convey information relating to efforts underway to rehabilitate a service center on the chronic list. The dashboard may demonstrate to the business partner: a number of service centers currently on the chronic list, historical chronic list data, identified root problems at service centers included on the chronic list and any other suitable information.

Illustrative apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Apparatus and methods in accordance with the principles of the invention may include one or more features of the illustrative process shown in FIG. 1.

At step 101, data sources are identified. The data sources may be identified by evaluating whether the data sources are likely to contain indicators of whether a service center is underperforming. The indicators may include one or more technology malfunctions that occurred at service centers operated by the entity.

At step 103, data from the identified data sources is collected and filtered. The data may be filtered to obtain a technology malfunction that corresponds to an individual service center. The data may be filtered to obtain a malfunction related to a particular technology or category of technology.

At step 105, a weight is assigned to the data obtained at step 103. The weight may correspond to an effect of a technology malfunction on operation of a service center. A technology malfunction that has a greater impact on the operation of the service center may be assigned a greater weight.

At step 107, a health score is calculated. The health score may be calculated based on information associated with steps 101-105. At step 109, a dashboard is produced. The dashboard may display information relating to calculation of the health score, comparison of health scores, relevant statistics or any suitable information. The dashboard may display a list of service centers that are underperforming. Underperforming service centers may be included in a chronic list (not shown).

At step 111, a service center characterized as underperforming is remediated. Remediation may include allocating resources needed to improve performance of the service center. At step 113, criteria are established for securing the release of a service center from the characterizing as underperforming. The release criteria may include an improved health score of the service center.

At step 115, the service center that has been remediated is monitored. The service center may be monitored to ensure that the service center continues to operate for a period of time with fewer technology malfunctions than before remediation.

FIG. 2 shows illustrative information that may be used in accordance with principles of the invention. The information may be obtained from the data sources identified in FIG. 1 at step 101 or any other suitable source. A technology malfunction may be associated with one of classes 201. Classes 201 may indicate a field of technology experiencing a malfunction. The field of technology may be included in an incident ticket (not shown). Classes 201 may indicate a location where a technology malfunction has occurred. The location may be included in a vendor dispatch (not shown).

Each of classes 201 may be associated with one or more of sub-classes 203. Each of sub-classes 203 may indicate a specific machine, system or resource experiencing a technology malfunction. A reporting system of the entity may provide a platform for manual association of a technology malfunction with one of classes 201 and/or sub-classes 203.

The entity may automatically detect a technology malfunction at a service center. The system may generate alerts 205 when a technology malfunction is automatically detected. Alerts 205 may be assigned a title describing a nature of the detected technology malfunction. Alerts 205 may be included in the data sources that include indicators of whether a service center is experiencing a technology malfunction.

FIG. 3 shows illustrative information 300. Information 300 may include intensity scores 301. Intensity scores 301 may be calculated for a category of technology malfunctions that occur at a service center. Intensity score 301 may reflect a total number of technology malfunctions in a category multiplied by a weight associated with the category.

A master intensity score may be calculated. The master intensity score may include a sum of all intensity scores calculated for each category of technology malfunctions associated with a service center. Intensity scores 301 may be master intensity scores.

Intensity score 301 may be normalized and used to calculate health scores 303. Each of health scores 303 are based on the corresponding intensity score. If a health score is below a threshold, the service center may be characterized as underperforming. Items 315 and 313 show that if a threshold is a health score of 70% or below, an intensity score of 35 may correspond to a health score of 69.90%. Thus, a service center with an intensity score of 35 may be characterized as underperforming. The threshold may be adjusted as appropriate.

Information 300 may include incident counts 305. Each of incident counts 305 may include a total number of technology malfunctions that occurred at a service center. The total number of technology malfunctions that occurred at a service center may include technology malfunction in a plurality of categories. Each of incident counts 305 may be normalized to correspond to a health score. Health scores 307 are calculated based on incident counts 305.

If the health score calculated based on incident count 305 is below a threshold, the service center may be characterized as underperforming. Items 317 and 319 show that if a threshold is a health score of 70% or below, an incident count of 15 may correspond to a health score of 70%. Thus, a service center with an incident count of 15 may be characterized as underperforming. The threshold may be adjusted as appropriate.

Information 300 may include Voice and Data Network counts 309. Each of Voice and Data Network counts 309 may include a total number of technology malfunctions that occurred at a service center relating to voice and data networks used by the service center.

A voice and data network malfunction may present a severe operational impairment to a service center. A voice and data network malfunction may be assigned a higher weight then another category of technology malfunctions. A total count of voice and data network malfunctions that occurred at a service center may be tallied independently of other technology malfunctions.

Each of voice and data network counts 305 may be normalized and correspond to a health score. Health scores 311 are calculated based on respective voice and data network counts 311.

If a health score 311 is below a threshold, the service center may be characterized as underperforming. Count 321 and health score 323 show that if a threshold is a health score of 70% or less, a voice and data network count of 5 may be associated with a health score of 70%. Thus, a service center with a voice and data network count of 5 may be characterized as underperforming. The threshold may be adjusted as appropriate.

FIG. 4 shows other illustrative information that may be generated in accordance with principles of the invention. The information included in FIG. 4 may be accessible and/or displayed via the dashboard.

A service center with a calculated health score that is below a threshold may be characterized as underperforming and placed on chronic list 401. Service centers on chronic list 401 may represent service centers whose performance lags behind other service centers operated by the entity.

Chronic list 401 includes rows 441 and columns 443. Rows 441 represent individual service centers that have been added to chronic list 401. Columns 443 represent informational items associated with each service center in rows 441.

For example, row 445 represents a service center in a particular city location 421, state 423 and national region 425. Each service center may be uniquely identified based on an organizational mailcode 419. Mailcode 419 may associate a technology malfunction with the service center.

Each service center on chronic list 401 is associated with a health score below a threshold. Column 402 displays a date when the health score of the service center was first calculated to be below the threshold.

Column 407 displays a date when the health score will be recalculated. Column 407 may represent a date when it is anticipated that the service center will have been rehabilitated and a recalculated health score will be above the threshold.

Column 411 displays an amount of days between a current date and the date when the health score will be recalculated. An amount of time may be allocated to rehabilitate the service center. After the amount of time has elapsed, the health score may be recalculated. If the recalculated health score is above the threshold, the service center may be removed from the chronic list.

Column 411 may represent an amount of allocated time remaining to rehabilitate the service center before the service center's health score is recalculated.

Column 413 indicates whether a service center has previously been listed on the chronic list. If the service center has been previously listed, column 414 displays the last date the service center was on the chronic list.

Column 415 provides explanatory remarks. For example, in row 445, column 415 explains that the service center has been on the chronic list previously and provides a reason why the service center was on the chronic list. As a further example, in row 447, column 415 explains that the service center continues to be listed on chronic list 401 because it has not been rehabilitated despite being on the chronic list 401 for thirty days. Column 409 may indicate a total number of the days a service center has been on chronic list 401.

Column 417 indicates a priority assigned to a service center on chronic list 401. The priority may depend on the reason (in column 415) the service center is included on chronic list 401. For example, in row 445, the service center is assigned a "critical" priority in column 417 because the service center has been included on chronic list 401 in the past, as noted in column 413.

The priority listed in column 417 may correspond to resources allocated to rehabilitate the service center. A service center with a higher priority may be allocated additional resources within a shorter period of time than a service center with a lower priority.

Information included in chronic list 401 may be analyzed to identify trends among underperforming service centers. A trend may include identifying a geographic location that includes a higher percentage of underperforming service centers.

FIG. 5 shows an illustrative display of metrics 530. Metrics 530 may be accessible and/or displayed via the dashboard.

Metrics 530 may be based on characteristics of service centers on the chronic list (shown in FIG. 4). Metrics 530 may provide leverage to the entity in renegotiating existing contracts and/or forming new contracts. Metrics 530 may demonstrate to business partners of the entity a current state of underperforming service centers and progress made in reducing a number of underperforming service centers.

Column 501 shows a date. Each of rows 521 corresponds to a date in column 501. As of a particular date, column 503 shows a percentage of service centers included in the chronic list (shown in FIG. 4). For example, the percentage may be calculated by dividing a number of service centers on the chronic list by a total number of service centers operated by the entity.

Column 505 shows average service center health scores. The average health scores may be calculated, for example, based on health scores of service centers operated by the entity that are characterized as underperforming and service centers operated by the entity that are performing properly.

Column 507 shows a number of service centers that are included in the chronic list as of the particular date in column 501.

Column 509 shows numbers of service centers included in the chronic list that have been on the chronic list for a period of thirty days or more. Column 509 shows service centers that have been on the chronic list for thirty days or more. Service centers on the chronic list for a period of time may be assigned a higher priority and may be allocated additional resources to speed remediation.

Column 511 shows average amounts of time that corresponding service centers characterized as underperforming have spent on the chronic list. Column 513 shows numbers of new service centers that have been added to the chronic list compared to a prior date listed in column 501.

Column 515 shows numbers of service centers that have been remediated after a date listed in column 501. A remediated service center may qualify for removal from the chronic list.

Column 517 shows numbers of service centers that are now included in the chronic list and have been included in the chronic list once before. A service center that is a "repeat chronic" may indicate that the service center is plagued by technology malfunctions that cause the service center to be repeatedly characterized as underperforming. Resources may be allocated to investigate and correct technology malfunctions at the service center based on a characterization of the service center as a "repeat chronic."

Column 519 shows rolling thirty day averages of technology malfunctions per service center. Each of the rolling averages may be calculated by (a) examining technology malfunction in a prior time period; (b) totaling all technology malfunctions that occur at all service centers operated by the entity; and (c) dividing by the total number of service centers. The time period may be thirty days or any suitable time period.

Metrics 530 are exemplary and any suitable or desired metrics may be included.

Figure 6:
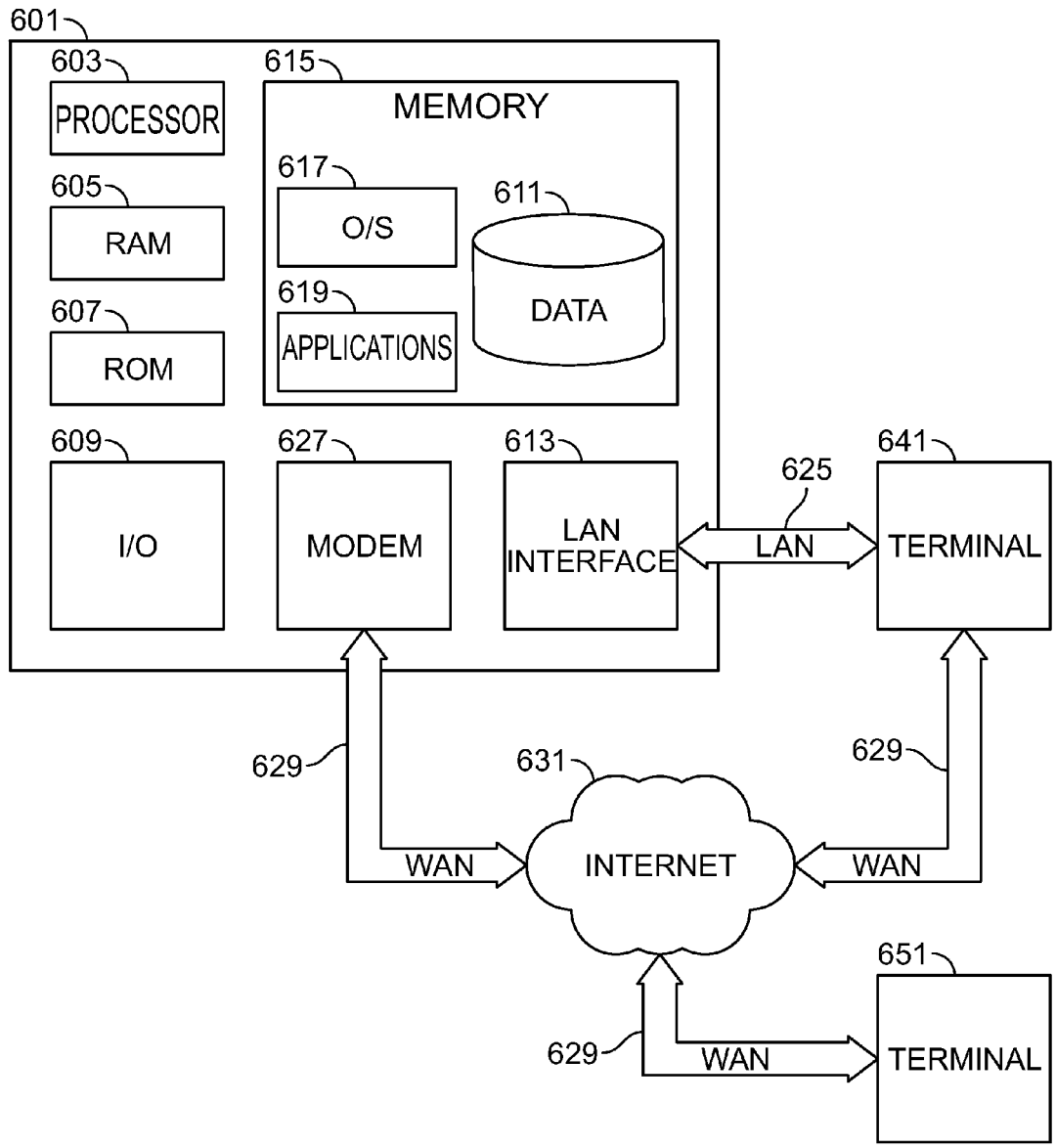
FIG. 6 shows a schematic diagram of a general purpose digital computing environment in which one or more aspects of the present invention may be implemented.

FIG. 6 illustrates generic computing device 601 (alternatively referred to herein as a "server") that may be used according to an embodiment of the invention. The computer server 601 may have a processor 603 for controlling overall operation of the server and its associated components, including RAM 605, ROM 607, input/output module 609, and memory 615.

I/O module 609 may include a microphone, keypad, touch screen, and/or stylus through which a user of device 601 may provide input, and may also include one or more of a speaker for providing audio output and a video display device for providing textual, audiovisual and/or graphical output. Software may be stored within memory 615 and/or storage to provide instructions to processor 603 for enabling server 601 to perform various functions. For example, memory 615 may store software used by server 601, such as an operating system 617, application programs 619, and an associated database 611. Alternatively, some or all of server 601 computer executable instructions may be embodied in hardware or firmware (not shown). Database 611 may provide centralized storage of intensity scores, incident counts, network counts, information included in a chronic list, technology malfunctions or other information utilized by apparatus and methods of the invention.

Server 601 may operate in a networked environment supporting connections to one or more remote computers, such as terminals 641 and 651. Terminals 641 and 651 may be personal computers or servers that include many or all of the elements described above relative to server 601. The network connections depicted in FIG. 6 include a local area network (LAN) 625 and a wide area network (WAN) 629, but may also include other networks. When used in a LAN networking environment, computer 601 is connected to LAN 625 through a network interface or adapter 613. When used in a WAN networking environment, server 601 may include a modem 627 or other means for establishing communications over WAN 629, such as Internet 631. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 619 used by server 601 according to an illustrative embodiment of the invention may include computer executable instructions for invoking user functionality related to communication, such as email, short message service ("SMS"), and voice input and speech recognition applications.

Computing device 601 and/or terminals 641 or 651 may also be mobile terminals including various other components, such as a battery, speaker, and antennas (not shown).

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Thus, systems and methods for rehabilitation of an underperforming service center have been provided. Persons skilled in the art will appreciate that the present invention can be practiced by other than the described embodiments, which are presented for purposes of illustration rather than of limitation. The present invention is limited only by the claims that follow.

What is claimed is:

1. One or more non-transitory computer-readable media storing computer-executable instructions which, when executed by a processor on a computer system, perform a method for characterizing a service center as underperforming, the method comprising:

calculating, by the processor, an intensity score based on a first number of service center technology malfunctions, each of the technology malfunctions associated with a first category of technology malfunctions, said first category associated with a first value, wherein for service center $SC_S$ and first category $Category_k$, the intensity score $IS_i$ is determined by the equation:

$$IS_{j,k} = Value_k * L(j,k),$$

wherein:

$Value_k$ is the first value, associated with $Category_k$; and

L(j,k) is a number of the technology malfunctions associated with service center $SC_j$ and $Category_k$;

calculating, by the processor, an incident score based on a second number of service center technology malfunctions, each associated with one of a plurality of categories, said plurality of categories comprising at least one category associated with a network technology malfunction and at least one category associated with a non-network technology malfunction, wherein for service center $SC_j$, plurality of categories $Category_{k|\forall k=1,2,3...K}$, and total number of technology malfunctions $TNTM_j$, the incident score is determined by the equation:

$$IS_{j,k} = Value_k * L(j,k),$$

wherein:
L(j,k) is the number of technology malfunctions associated with service center $SC_j$ and $Category_k$,
k=1, 2, 3 . . . K is an index number corresponding to one of the categories included in the plurality of categories $Category_{k|\forall k=1,2,3...K}$; and
the incident score corresponds to $TNTM_j$; and calculating, by the processor, a network count based on a third number of service center technology malfunctions, each of the technology malfunctions associated with a second category, said second category corresponding to a network technology malfunction;

calculating a health score wherein the health score is one of:
a normalized intensity score, wherein the normalized intensity score is based on the intensity score;
a normalized incident score, wherein the normalized incident score is based on the incident score; and
a normalized network count, wherein the normalized network count is based on the network count;
comparing the health score to a threshold; and
if the health score is below the threshold, characterizing the service center as underperforming.

2. The media of claim 1 wherein, in the method, the first, second and third number of service center technology malfunctions comprise counting:
(a) a service center technology malfunction associated with an auto detection of the malfunction; and
(b) a service center technology malfunction associated with a request to repair the malfunction.

3. The media of claim 1 wherein, in the method, the calculating comprises calculating the health score weekly.

4. The media of claim 1 wherein, in the method, the calculating is based on a service center technology malfunction that occurred in a thirty day period preceding the calculating.

5. The media of claim 1 wherein, in the method, the calculating is based on a previously calculated health score.

6. The media of claim 1 wherein, the method further comprises selecting a service center technology malfunction based on an organizational mailcode associated with the service center.

7. The media of claim 1 wherein, the method further comprises prioritizing resources allocated to rehabilitate an underperforming service center based on the health score.

8. The media of claim 7 wherein, in the method, the prioritizing is based on a difference between the health score and a threshold.

9. The media of claim 7 wherein, in the method, the prioritizing is based on an amount of time the health score is below the threshold.

10. The media of claim 1, the method further comprising:
placing the underperforming service center on a chronic list for a predetermined time period designated for rehabilitating the service center;
assigning a priority designation to the underperforming service center, said priority designation based on one of:
a reason for inclusion on the chronic list;
a difference between a calculated health score and a threshold;
a cumulative amount of time that the service center has been listed on the chronic list;
identifying resources to rehabilitate an underperforming service center, wherein the resources are allocated based on the priority designation assigned to the service center;
adapting the chronic list for display, said adapting comprising configuring the chronic list such that when displayed the list shows:
the time period designated for rehabilitating the service center;
the priority designation for the service center;
the resources allocated to rehabilitate a service center;
at the conclusion of the time period designated for rehabilitating the service center, recalculating the health score; and
in response to recalculating the health score, if the recalculated health score exceeds the threshold, moving the service center to a recovery list for a predetermined time period, wherein a service center on the recovery list is monitored for technology failures.

11. The media of claim 1, the method further comprising mining the chronic list and recovery list for characteristics of underperforming service centers.

12. A system for characterizing a service center as underperforming, the system comprising:
a processor configured to:
calculate a health score;
compare the health score to a threshold score; and
if the health score is below the threshold score, characterize the service center as underperforming; and
a transmitter device, configured to transmit based on the health score, a characterization of the service center as underperforming;
wherein the processor is configured to calculate:
an intensity score based on a first number of service center technology malfunctions, each of the technology malfunctions associated with a first category of technology malfunctions, said first category associated with a first value, wherein for service center $SC_j$ and first category $Category_k$, the intensity score $IS_{j,k}$ is determined by the equation:

$$IS_{j,k} = Value_k * L(j,k),$$

wherein:
$Value_k$ is the first value, associated with $Category_k$; and
L(j,k) is the number of technology malfunctions associated with service center $SC_j$ and $Category_k$;
an incident score based on a second number of service center technology malfunctions, each associated with one of a plurality of categories, said plurality of categories comprising at least one category associated with a network technology malfunction and at least one category associated with a non-network technology malfunction, wherein for service center $SC_j$, plurality of categories $Category_{k|\forall k=1,2,3...K}$, and total number of technology malfunctions $TNTM_j$, the incident score is determined by the equation:

$$TNTM_j = \sum_{k=1}^{K} L(j, k)$$

wherein:
- L(j,k) is the number of technology malfunctions associated with service center $SC_j$ and $Category_k$;
- k=1, 2, 3 . . . K is an index number corresponding to one of the categories included in the plurality of categories $Category_k|_{\forall k=1, 2, 3, \ldots K}$; and
- the incident score corresponds to $TNTM_j$; and a network count based on a third number of service center technology malfunctions, each of the technology malfunctions associated with a second category, said second category corresponding to a network technology malfunction;

wherein:
the health score is one of:
- a normalized intensity score, wherein the normalized intensity score is based on the intensity score;
- a normalized incident score wherein the normalized incident score is based on the incident score; and
- a normalized network count wherein the normalized network count is based on the network count.

13. The system of claim 12 wherein, configuring the processor calculate the first, second and third number of service center technology malfunctions comprises configuring the processor to count:

(a) a service center technology malfunction associated with an auto detection of the malfunction; and
(b) a service center technology malfunction associated with a request to repair the malfunction.

14. The system of claim 12 further comprising a machine readable memory configured to store:
- the first number of service center technology malfunctions;
- the association with the first number of service center technology malfunctions and a first category;
- the second number of service center technology malfunctions;
- the association with the second number of service center technology malfunctions and a plurality of categories;
- the third number of service center technology malfunctions; and
- the association with the third number of service center technology malfunctions and a second category.

15. The system of claim 14 wherein:
the machine readable memory is configured to store:
- the first category;
- the association with the first category and a first value; and the processor is configured to calculate the intensity score based on the first value.

16. The system of claim 12 wherein, the processor is configured to calculate the health score weekly.

* * * * *